United States Patent Office 2,995,545
Patented Aug. 8, 1961

2,995,545
METHOD OF BROMINATING BUTYL RUBBER IN THE PRESENCE OF HETEROCYCLIC TERTIARY AMINES, PRODUCT OBTAINED, AND VULCANIZED PRODUCT THEREOF
Delmer L. Cottle, Highland Park, Leon S. Minckler, Jr., Metuchen, and Lawrence T. Eby, Linden, N.J., assignors to Esso Research and Engineering Company, a corporation of Delaware
No Drawing. Filed Sept. 30, 1957, Ser. No. 686,890
16 Claims. (Cl. 260—85.3)

This invention relates to the preparation of high molecular weight bromine-containing rubbery copolymers of isoolefins and multiolefins, particularly highly unsaturated brominated butyl rubber produced in the presence of certain tertiary amines.

Heretofore, it has been impossible to produce butyl rubber copolymers, with or without chemical modification, which are of high unsaturation without, at the same time, degrading the molecular weight. The desirability of such high molecular weight highly unsaturated butyl rubber copolymers is apparent inasmuch as they would be vulcanizable or covulcanizable with other highly unsaturated rubbery polymers such as natural rubber or rubbery diene-styrene copolymers using sulfur alone as the curative.

In accordance with the present invention, it has now been found that rubbery isoolefin-multiolefin copolymers such as butyl rubber, originally having iodine numbers of about 0.5–18.0, may be brominated in the presence of heterocyclic tertiary amines to form high molecular weight modified rubbery copolymers of high unsaturation (e.g., having iodine numbers of about 20–80 or higher) which, upon curing, result in vulcanizates of increased extension modulus (e.g., at 300% elongation of 2,000–4,000 p.s.i., preferably 2,500–3,500 p.s.i.) and which may be cured or covulcanized at about 250° to 450° F. with other rubbery polymers by sulfur alone or in admixture with conventional rubber vulcanization accelerators.

Butyl rubber copolymers comprise a major proportion (preferably about 97.0 to 99.5 weight percent) of a $C_4$ to $C_8$ isoolefin such as isobutylene, 2-methyl-1-butene or 3-methyl-1-butene, etc., with a minor proportion (preferably about 3.0 to 0.5 weight percent) of a multiolefin of about 4 to 14, preferably of about 4 to 6 carbon atoms and are commonly referred to in patents and technical literature as "butyl rubber," or GR–I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, myrcene, dimethallyl, allo-ocimene, vinyl fulvenes, etc. The copolymer comprising isobutylene and isoprene is preferred, although the copolymer may contain about 0.05 to 20.0, preferably about 0.2 to 5.0, parts by weight based on total reacting comonomers of such monoolefinic compounds as styrene, p-methylstyrene, alpha-methylstyrene, indene, dihydronaphthalene, dichlorostyrene, p-chlorostyrene, mixtures thereof, etc. Such a copolymer has a Staudinger molecular weight between about 20,000 and 300,000, or a viscosity average molecular weight of about 250,000 to 2,000,000 and an iodine number between about 0.5 and 15 or 18.

The modified rubbery isoolefin-multiolefin copolymers of the present invention are produced by carefully brominating these copolymers in the presence of a tertiary amine (present in an amount of about 0.1 to 10.0) preferably about 0.5 to 5.0, times the weight of added bromine available for bromination, so as not to degrade the molecular weight thereof and in some instances to increase its molecular weight. The bromination is regulated so that the resulting modified rubber will contain at least about 0.5 weight percent (preferably at least about 1.0 weight percent) combined bromine but not more than about 3.0 "X" weight percent combined bromine wherein:

$$X = \frac{M_3 L}{(100-L)M_1 + L(M_2+M_3)} \times 100$$

and $L$ = mole percent of the multiolefin in the polymer,
$M_1$ = molecular weight of the isoolefin,
$M_2$ = molecular weight of the multiolefin,
$M_3$ = atomic weight of bromine The modified copolymer formed generally contains about 1 to 15 weight percent bromine and preferably about 2 to 8 weight percent combined bromine.

Suitable brominating agents which may be employed are liquid bromine, alkali metal hypobromites, $C_4$ to $C_{10}$ tertiary alkyl hypobromites, sulfur bromides (particularly sulfuryl bromide), pyridinium bromide perbromide, N-bromosuccinimide, alpha-bromo-acetanilide, N,N'-dibromo-5,5 dimethylhydantoin, tribromophenol bromide, N-bromoacetamide, N-bromo-phthalimide, etc.

The modification reaction is generally conducted at temperatures of above about 0° to about +200° C., preferably at about 20° to 150° C. (depending upon the bromination temperature used, and the particular bromination agent and tertiary amine employed) for a time of about 0.1 to 100 hours, although this time is not especially critical. Bromination times of about 0.1 to 3.0 hours are preferred. An advantageous pressure range is from about 0.5 to 400 p.s.i.a., atmospheric pressure being satisfactory. The modification reaction may be accomplished preferably by preparing a 1 to 80 weight percent solution of such copolymers as above, in a substantially inert liquid organic solvent such as a $C_5$ to $C_{10}$ substantially inert hydrocarbon, e.g., hexane, mineral spirits, cyclohexane, benzene, chlorobenzene, mixtures thereof, etc., and adding thereto the tertiary amine and then preferably subsequently adding the brominating agent, which may optionally be in solution, such as dissolved in a substantially inert hydrocarbon, or other inert solvent.

The resulting modified isoolefin-multiolefin-containing copolymer, which has an iodine number (drastic mercuric acetate method) of about 20–80 or higher, may be recovered by precipitation with oxygenated hydrocarbons, particularly alcohols or ketones such as acetone or any other known non-solvent for the rubbery copolymer and dried under about 0.1 to 760 millimeters or higher of mercury pressure absolute at about 0° to 180° C., preferably about 50° to 150° C. (e.g., 70° C.). Other methods of recovering the modified polymer are by conventional spray or drum drying techniques. Alternatively, the solution of modified butyl rubber may be injected into a vessel containing steam and/or agitated water heated to a temperature sufficient to volatilze the solvent and form an aqueous slurry of the modified butyl rubber. This modified butyl rubber may then be separated from the slurry by filtration and drying and recovered as a "crumb" or as a dense sheet or slab by conventional hot milling and/or extruding procedures. As so produced the modified rubbery copolymer has a Staudinger molecular weight within the range of approximately 20,000 to 300,000, preferably about 25,000 to 200,000, and an iodine number of about 20 to 150, preferably about 20 to 80; or even more especially 20 to 50 to 60.

For the purposes of the present invention, the tertiary amine may be a heterocyclic tertiary amine which is preferably pyridine, quinoline, or a substituted pyridine or quinoline of the general formulae:

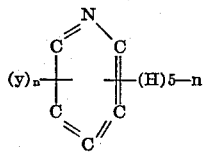

(I)

or

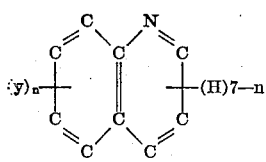

(II)

in which y is selected from the group consisting of R, OR and OH; R being selected from the group consisting of $C_1$ to $C_{20}$ alkyl, cycloalkyl, aryl, aralkyl and alkaryl; n being an integer of between about 0 and 3.

Typical tertiary amines, useful for the purposes of the present invention include, among others: quinoline; isoquinoline; alpha methyl quinoline; hydroxy quinoline; dimethyl quinoline; methoxy quinoline; $\alpha,\alpha'$-dipyridyl; benzyl pyridine; ethylmethyl pyridine; hydroxypyridine; tri-methylpyridine; and especially pyridine. The resulting reaction products formed have utility as rubber insulation, in air springs, hosing, curing bladders, belting, proofed goods, tires, etc.

In order to more fully illustrate the present invention, the following experimental data are given.

*Example I*

100 parts by weight of a butyl rubber copolymer having a viscosity average molecular weight of 485,000, and a Mooney viscosity (212° F. for 8 minutes) of 75, dissolved in an aluminum-chloride treated narrow cut hexane fraction to a concentration of 11.5 weight percent, were brominated with 6 weight percent added liquid bromine, both in the absence and presence of 120 weight percent (based on bromine) of previously added pyridine. The reaction was at room temperature for 72 hours for the pyridine reaction and 30 minutes for the reaction without pyridine. The properties of the various polymers were as follows:

|  | Intrinsic viscosity | Iodine No. | Bromine content (weight percent) |
|---|---|---|---|
| Original polymer | 1.40 | 10.9 | |
| Brominated polymer | 0.95 | 8.5 | 2.34 |
| Pyridine brominated polymer | 1.57 | 32.3 | 1.27 |

The above data show that bromination in the presence of a tertiary amine (e.g., pyridine) results in stability of molecular weight (as exemplified by a good intrinsic viscosity) and a marked increase in the iodine number (unsaturation). The bromine content of the modified polymer which had been brominated in the presence of pyridine was somewhat less than the bromine content of the modified polymer which had been brominated in the absence of pyridine.

*Example II*

100 parts by weight of the pyridine-brominated butyl rubber product were compounded with 5 parts by weight of zinc oxide, 50 parts by weight of SAF carbon black, 2 parts by weight of sulfur, and 1 part by weight of tellurium diethyl dithiocarbamate and cured at 307° F. for the periods of time given hereinafter with the following physical properties being noted:

| Property | Vulcanization time (minutes) | | |
|---|---|---|---|
|  | 45 | 90 | 180 |
| Modulus at 300% elong. (p.s.i.) | 2,190 | 2,480 | 2,550 |
| Tensile strength (p.s.i.) | 3,690 | 3,900 | 3,570 |
| Elongation (percent) | 485 | 450 | 415 |

The above data show that vulcanizates of products of the present invention exhibit exceptionally high moduli as well as good tensile strengths and elongations. The unmodified butyl rubber and butyl rubber brominated in the absence of pyridine, when compounded and vulcanized as above, gave the following range of physical inspections.

Modulus at 300% elong. (p.s.i.) _____ 1500–1700
Tensile strength (p.s.i.) _____ 2800–3200
Elongation (percent) _____ 450–520

*Example III*

The same general procedure of pyridine-bromination of butyl rubber as in Example I was repeated except that the modification reaction was at 140° F. instead of room temperature. The properties of both the unvulcanized modified product and vulcanizates cured as in Example II were as follows:

Properties of uncured polymer: Value
  Iodine number (cg./g.) _____ 39
  Intrinsic viscosity _____ 1.57
  Bromine content (wt. percent) _____ 1.65

| Vulcanizate properties | Vulcanization time (minutes) | | |
|---|---|---|---|
|  | 15 | 90 | 180 |
| Modulus at 300% elong. (p.s.i.) | 2,650 | 3,080 | 3,340 |
| Tensile strength (p.s.i.) | 3,600 | 3,560 | 3,570 |
| Elongation (percent) | 390 | 340 | 320 |

The above data show that pyridine-bromination at an elevated temperature results in substantially the same advantageous improvements in butyl rubber as pyridine-bromination at room temperature.

*Example IV*

The same general procedure as in Example III was repeated except that tellurium diethyl dithiocarbamate was omitted during compounding, the physical properties for vulcanizates cured at 307° F. being as follows:

| Property | Vulcanization time (minutes) | | |
|---|---|---|---|
|  | 15 | 90 | 180 |
| Modulus at 300% elong. (p.s.i.) | 2,450 | 2,845 | 3,100 |
| Tensile strength (p.s.i.) | 2,915 | 3,325 | 3,330 |
| Elongation (percent) | 390 | 350 | 315 |

The above data show that ultra-accelerators such as derivatives of carbamic acid may be omitted during the vulcanization of pyridine-brominated butyl rubber without adversely affecting the advantages of the resulting cured vulcanizates in accordance with the present invention.

*Example V*

The same general procedure as in Example I was repeated varying the amount of added bromine and reaction time at room temperature as shown hereinafter with the following results upon curing at 307° F.

| | Sample A | Sample B | Sample C | Sample D | Sample E |
|---|---|---|---|---|---|
| Weight percent of bromine added | 6 | 6 | 12 | 4 | 6 |
| Reaction time, hrs | 96 | 1 | 16 | 72 | 16 |
| Product iodine number (cg./g.) | 38 | 15.3 | 32 | 22 | 21 |
| Combined bromine, weight percent | 1.98 | 2.22 | 2.97 | 1.27 | 1.99 |
| 15 minute cure: | | | | | |
| Modulus at 300% elong. (p.s.i.) | 3,120 | 3,240 | 3,200 | 2,120 | 2,940 |
| Tensile strength (p.s.i.) | 3,500 | 3,450 | 3,270 | 3,510 | 3,330 |
| Elongation (percent) | 340 | 325 | 330 | 415 | 325 |
| 180 minute cure: | | | | | |
| Modulus at 300% elong. (p.s.i.) | 3,260 | 3,390 | 3,000 | 2,840 | |
| Tensile strength (p.s.i.) | 3,610 | 3,460 | 3,210 | 3,730 | 3,050 |
| Elongation (percent) | 330 | 310 | 310 | 380 | 280 |

The above data show that both the reaction time and amount of added bromine may be varied considerably without adversely affecting the desired results in accordance with the present invention.

*Example VI*

The same general procedure as in Example I was repeated varying the modification reaction time at room temperature from 0 to 96 hours with the following changes in iodine number and intrinsic viscosity being noted:

| Time (hrs.) | Iodine No. (Cg./g.) | Intrinsic viscosity |
|---|---|---|
| 0 | 10.9 | 1.40 |
| 1 | 15.3 | 1.42 |
| 16 | 21.0 | 1.48 |
| 72 | 32.3 | 1.57 |
| 96 | 37.6 | 1.62 |

The above data show that as the modification reaction time increases, both the iodine number and intrinsic viscosity of the resulting product increase.

*Example VII*

The same general procedure as in Example I was repeated conducting the modification reaction at room temperature for two different periods of time and curing at 287° F. for between 7.5 and 90 minutes with the following results:

| | Sample F | Sample G |
|---|---|---|
| Reaction time (hrs.) | 16 | 72 |
| 7.5 minute cure: | | |
| Modulus at 300% elong. (p.s.i.) | 2,610 | 2,830 |
| Tensile Strength (p.s.i.) | 3,510 | 3,410 |
| Elongation (percent) | 415 | 345 |
| 90 minute cure: | | |
| Modulus at 300% elong. (p.s.i.) | 2,910 | |
| Tensile strength (p.s.i.) | 3,790 | 3,500 |
| Elongation (percent) | 400 | 295 |

The above data show that both the modification reaction time and curing or vulcanizing time may be varied considerably without adversely affecting the desired results in accordance with the present invention.

Resort may be had to modifications and variations of the disclosed embodiments without departing from the spirit of the invention or the scope of the appended claims.

What is claimed is:

1. A composition having an iodine number of between 20 and 150 which comprises the reaction product of butyl rubber which is a major proportion of an isoolefin and a minor proportion of a multiolefin, said butyl rubber having an iodine number of between about 0.5 and 18, a brominating agent for the said butyl rubber and a heterocyclic tertiary amine selected from the group consisting of:

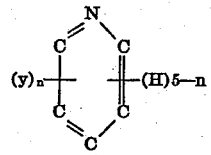

and

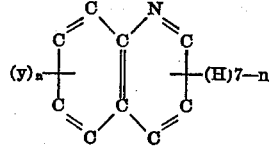

in which $y$ is selected from the group consisting of R, OR and OH; R being selected from the group consisting of $C_1$ to $C_{20}$ alkyl, cycloalkyl, aryl, aralkyl, and alkaryl; $n$ being an integer of between about 0 and 3.

2. A composition according to claim 1 in which the halogenated copolymer formed contains at least about 0.5 weight percent bromine but not more than about 3 combined atoms of bromine per double bond in the copolymer.

3. A composition according to claim 1 which has been vulcanized in the presence of added curatives at a temperature level of between about 250° and 450° F. for at least 7.5 minutes whereby an extension modulus at 300% elongation of at least about 2,000 p.s.i. is obtained.

4. A composition according to claim 1 in which the amount of heterocyclic tertiary amine added is between about 0.1 to 10.0 times the weight of added bromination agent.

5. A composition according to claim 1 in which the reaction is at about 0° to 200° C. for between about 5 minutes and 10 days.

6. A composition according to claim 1 having an iodine number of between about 20 and 80.

7. A composition comprising a rubbery polymer 97.0 to 99.5% of an isoolefin and 3.0 to 0.5% of a multiolefin having a Staudinger molecular weight of between about 20,000 and 300,000 comprising atoms of hydrogen, carbon and bromine containing in its structure a major proportion of hydrocarbon units derived by the polymerization of isoolefins containing about 4 to 8 carbon atoms and having an iodine number of between about 20 and 80; said polymer containing at least 0.5 weight percent bromine but not more than about 3 combined atoms of bromine per double bond in the polymer, said polymer having been produced by bromination in the presence of a minor proportion of a heterocyclic tertiary amine selected from the group consisting of:

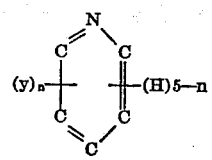

and

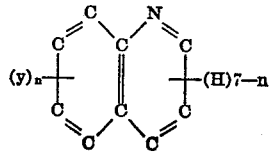

in which y is selected from the group consisting of R, OR and OH; R being selected from the group consisting of $C_1$ to $C_{20}$ alkyl, cycloalkyl, aryl, aralkyl, and alkaryl; n being an integer of between about 0 and 3.

8. A composition according to claim 7 in which the heterocyclic amine is pyridine.

9. A composition according to claim 7 in which the heterocyclic amine is quinoline.

10. A composition according to claim 7 which has been vulcanized in the presence of a filler at a temperature level of between about 250° and 450° F. for between about 15 minutes and 2 days and having a modulus at 300% elongation of 2,000–4,000 p.s.i.

11. A composition according to claim 7 in which the heterocyclic amine has the formula:

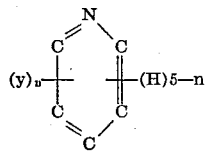

in which y is selected from the group consisting of R, OR, and OH; R being selected from the group consisting of $C_1$ to $C_{20}$ alkyl, cycloalkyl, aryl, aralkyl and alkaryl; n being an integer of between about 0 and 3.

12. A composition comprising an isoolefin-multiolefin butyl rubber copolymer containing in its structure between about 0.5 weight percent and about 15.0 weight percent bromine, said copolymer having an iodine number between about 20 and 80 and having been produced by brominating the butyl rubber in the presence of a heterocyclic tertiary amine selected from the group consisting of:

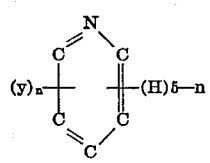

and

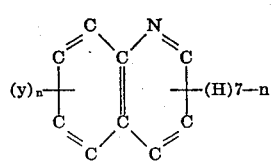

in which y is selected from the group consisting of R, OR and OH; R being selected from the group consisting of $C_1$ to $C_{20}$ alkyl, cycloalkyl, aryl, aralkyl, and alkaryl; n being an integer of between about 0 and 3.

13. A process for modifying rubbery copolymers 97.0 to 99.5% of an isoolefin and 3.0 to 0.5% of a multiolefin which comprises reacting with said copolymer, at a temperature level of between about 0° and 150° C. a minor proportion based on copolymer of an admixture of a brominating agent for said copolymer and a heterocyclic tertiary amine selected from the group consisting of:

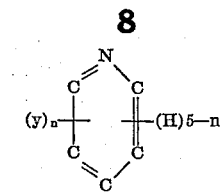

and

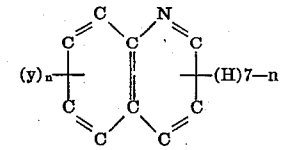

in which y is selected from the group consisting of R, OR and OH; R being selected from the group consisting of $C_1$ to $C_{20}$ alkyl, cycloalkyl, aryl, aralkyl, and alkaryl; n being an integer of between about 0 and 3.

14. A process according to claim 13 in which the resulting modified, halogenated copolymer is subsequently vulcanized at a temperature level of between about 250° and 450° F. for at least 7.5 minutes whereby a material having an extension modulus at 300% elongation of at least about 2,000 p.s.i. is produced.

15. A sulfur vulcanized product having an extension modulus at 300% elongation of at least about 2,000 p.s.i. containing the reaction product of 97.0 to 99.5% of an isoolefin and 3.0 to 0.5% of a multiolefin and an admixture of a brominating agent for said reaction product and a heterocyclic tertiary amine selected from the group consisting of:

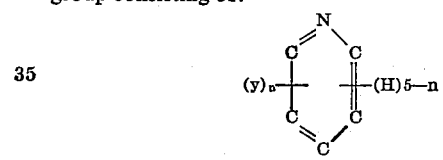

and

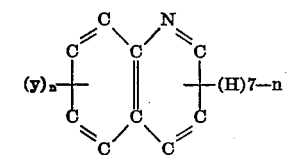

in which y is selected from the group consisting of R, OR and OH; R being selected from the group consisting of $C_1$ to $C_{20}$ alkyl, cycloalkyl, aryl, aralkyl, and alkaryl; n being an integer of between about 0 and 3.

16. A sulfur vulcanized product having an extension modulus at 300% elongation of between about 2,500 and 3,500 p.s.i. containing the reaction product of an isoolefin-multiolefin butyl rubber copolymer and an admixture of a brominating agent and a heterocyclic tertiary amine as defined in claim 1.

References Cited in the file of this patent

UNITED STATES PATENTS 2,631,984  Crawford _____ Mar. 17, 1953